(12) United States Patent
Wallenstein et al.

(10) Patent No.: US 11,588,874 B2
(45) Date of Patent: Feb. 21, 2023

(54) WEB-BASED CONTENT RECORDING AND ADAPTIVE STREAMING

(71) Applicant: McGraw-Hill Global Education Holdings, LLC, New York, NY (US)

(72) Inventors: Ori Wallenstein, Raanana (IL); Max Romanov, Petach-Tikva (IL); Oleg Yudovich, Tel Aviv (IL)

(73) Assignee: McGraw Hill LLC, New York, NY (US)

( * ) Notice: Subject to any disclaimer, the term of this patent is extended or adjusted under 35 U.S.C. 154(b) by 0 days.

(21) Appl. No.: 15/888,797

(22) Filed: Feb. 5, 2018

(65) Prior Publication Data
US 2019/0245903 A1    Aug. 8, 2019

(51) Int. Cl.
| | |
|---|---|
| H04L 65/75 | (2022.01) |
| H04L 67/10 | (2022.01) |
| H04L 67/303 | (2022.01) |
| H04L 67/02 | (2022.01) |
| H04L 65/80 | (2022.01) |
| H04L 67/306 | (2022.01) |
| H04L 65/70 | (2022.01) |
| H04L 65/612 | (2022.01) |

(52) U.S. Cl.
CPC ............ *H04L 65/75* (2022.05); *H04L 65/612* (2022.05); *H04L 65/70* (2022.05); *H04L 65/762* (2022.05); *H04L 65/80* (2013.01); *H04L 67/02* (2013.01); *H04L 67/10* (2013.01); *H04L 67/303* (2013.01); *H04L 67/306* (2013.01)

(58) Field of Classification Search
CPC ..... H04L 65/601; H04L 65/607; H04L 67/10; H04L 67/303

USPC ........................................................ 709/219
See application file for complete search history.

(56) References Cited

U.S. PATENT DOCUMENTS

| | | | |
|---|---|---|---|
| 2009/0164034 A1* | 6/2009 | Cohen .................. | G10H 1/0025 700/94 |
| 2012/0010995 A1* | 1/2012 | Skirpa .................... | G06F 16/95 705/14.49 |
| 2012/0254759 A1* | 10/2012 | Greenberg ............ | G06F 16/958 715/719 |
| 2014/0201619 A1* | 7/2014 | Mo ...................... | G06F 17/2247 715/234 |
| 2016/0088322 A1* | 3/2016 | Horev ................ | H04N 21/8456 725/14 |

(Continued)

*Primary Examiner* — Suraj M Joshi
*Assistant Examiner* — A F W
(74) *Attorney, Agent, or Firm* — Lowenstein Sandler LLP

(57) ABSTRACT

Systems and methods for recording "on-screen" content of a user device via a web browser-based coupling with a content recording system. The content to be recorded may include an audio component and a video component. The audio and video components are merged into a single stream that contains the content displayed via the user device. Segments of the recorded stream are periodically stored to a local storage associated with the web browser. Upon completion of the storage of a segment in the local storage, the segment is uploaded to the content recording system. As the recording session persists, multiple file segments are created in the local storage of the web browser and uploaded, on a segment-by-segment basis, to the server. The server of the content recording system concatenates the multiple uploaded file segments to generate a single file associated with the recorded session.

15 Claims, 5 Drawing Sheets

(56) References Cited

U.S. PATENT DOCUMENTS

2016/0323351 A1* 11/2016 Luthra .................. G06F 16/182
2016/0371290 A1* 12/2016 Danovitz ................ G06F 16/43
2017/0171508 A1*  6/2017 Pang ..................... H04N 7/141
2017/0188097 A1*  6/2017 Jones ................. H04N 21/2187

* cited by examiner

WEB-BASED CONTENT RECORDING AND ADAPTIVE STREAMING

BACKGROUND

In many instances, a user of a computing device (e.g., a desktop computer or a mobile device) may wish to "capture" or record content displayed on the computing device. For example, a source of the content may make a presentation including an audio component and a video component using a computing device. In addition to be being displayed on the source device, the recorded content may be broadcast or transmitted to one or more other computing devices.

DETAILED DESCRIPTION

Figure 1:
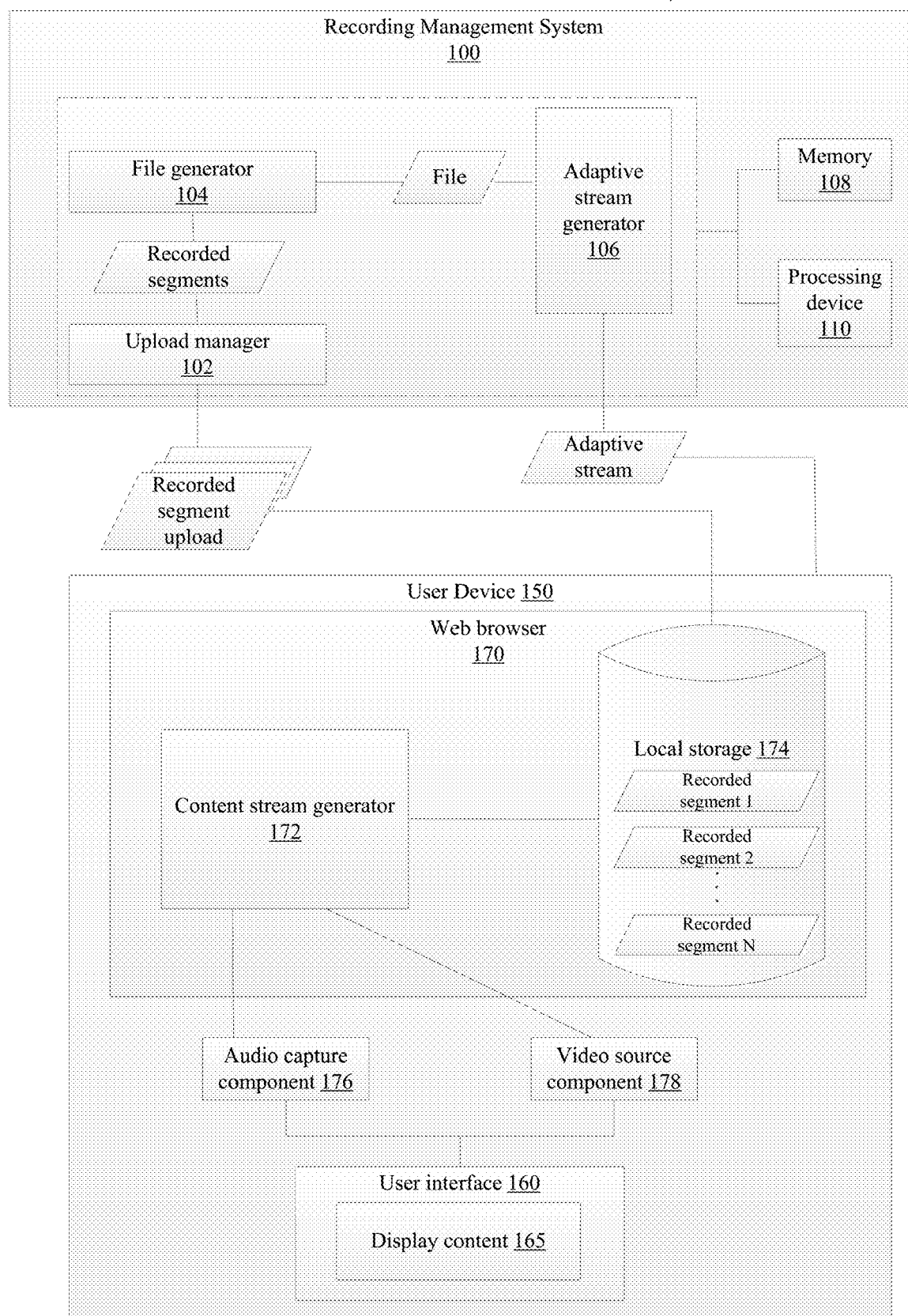
FIG. 1 is a block diagram illustrating an environment including a recording management system, according to an embodiment.

This disclosure relates to methods and systems for recording content of a user device. In one embodiment, a content recording system is described to provide a user interface for displaying content including an audio component and a video component. The content recording system provides for a web-based recording of content via a web browser of the user device. In one embodiment, the audio component and video component are accessed via the web browser. The audio and video components are merged into a single stream that contains the content displayed via the user device.

In one embodiment, segments or portion of the recorded stream are stored to a local storage associated with the web browser. For example, on a periodic basis (e.g., every minute, every five minutes, every ten minutes, etc.), a data dump is executed resulting in the storing of a portion or segment of the recorded stream (e.g., the segment or portion accruing during the period) in the local storage of the web browser. In one embodiment, following a periodic storing of a portion of the stream, a segment of a file including the stored segment is created in the local storage.

Upon completion of the creation of the file segment in the local storage, the file segment is uploaded from the local storage of the web browser to an operatively coupled server. In one embodiment, as the recording session persists, various file segments are created in the local storage of the web browser and uploaded, on a segment-by-segment basis, to the server. Upon identifying that all of the file segments associated with the recorded content have been uploaded (e.g., identifying the termination or end of a recording session), the server of the content recording system concatenates the multiple uploaded file segments to generate a single file associated with the recorded session.

In contrast to the improvements associated with the present application, conventional systems for recording a user device's computer screen involve a remotely located server configured to capture the recording of the user device. These server-side solutions wherein the recording is executed on the server, however, are difficult to scale up and require the maintenance of expensive servers relative to a number of concurrent user devices. In addition, many conventional recording systems are browser-specific, in that recording is limited to a single browser type (e.g., Google Chrome™ browser).

Furthermore, conventional systems that enable the capture of the recording locally on a browser do not permit the recording to be uploaded to a server in real-time (e.g., while the recording is in progress). Accordingly, an entire recording must be completed before upload is possible. As such, the user experiences a long delay following the termination of the recording for the upload of the recording to complete. During the upload process, the user can not close the current recording session or the browser or navigate to a different web page.

In one embodiment, the methods and systems of the present application overcome the above-identified deficiencies of the conventional systems. As such, improvement in the processing of a web browser-based recording including uploading to a server while the recording session is in progress is achieved. Furthermore, according to embodiments of the present application, browser-based recording is achieved using various different web browsers (e.g., Google Chrome™ browser, Mozilla FireFox®, etc.).

In one embodiment, the generated file of the recorded session created by the server may be transcoded to an adaptive stream. Accordingly, the adaptive stream may be transmitted to a computing device for playback in accordance with the computing capabilities and network parameters. In this regard, playback of the recording by one or more computing devices may be accomplished using the adaptive stream. In contrast, conventional recording solutions do not enable the transmission of the recording as an adaptive stream. For example, most user devices include cameras and screens that have a high definition resolution or higher. Encoding high definition content to a non-adaptive stream results in the use of high bandwidth encoding which retains the quality of the video, but is difficult and computational expensive to stream. Alternatively, a lower bandwidth encoding may be employed to stream the recording, but at a lower quality and detail of the content. In one embodiment, the adaptive stream playback enables the recorded session to be played back at a quality that is based on the network and computing conditions associated with the recipient computing device (e.g., bandwidth, display parameters, etc.)

FIG. 1 is a block diagram illustrating an example environment 10 including a recording management system 100 operatively coupled to a user device 150, according to an embodiment. In one embodiment, the recording management system 100 may be a computing device accessible by the user device 150 via a suitable network (not shown in FIG. 1). In one embodiment, the network may be any suitable network type, including, for example, the Internet, intranets, extranets, wide area networks (WANs), local area networks (LANs), wired networks, wireless networks, or other suitable networks, etc., or any combination of two or more such networks.

In one embodiment, the user device 150 is computing device (e.g., a mobile device, a desktop computer, a laptop computer, etc.) operating as a source of content to be recorded. In one embodiment, the user device 150 initiates a recording session wherein content associated with the user device 150 (e.g., display content 165 displayed via a user interface 160 of the user device 150). For example, the user device 150 may initiate a recording session to record the on-screen activity (e.g., the display content 165 including video content and audio content) of the user interface 160 of the user device 160. In one embodiment, a recording session includes the capturing of the audio and video associated with the user device 150 (e.g., the display content 165) during a period of time between an initiation of the recording process and a termination of the recording process.

In one embodiment, the user device 150 executes a web browser 170 including a content stream generator 172 and a local storage 174. In one embodiment, the content stream generator 172 is configured to capture an audio input and a video input associated with the display content 165 via the web browser 170. In one embodiment, the content stream generator 172 is a set of instructions configured to perform the steps and functions described herein in further detail. In one embodiment, the content stream generator 172 is a JavaScript program configured for execution by any one of various different types of web browsers (e.g., Google Chrome™ browser, Mozilla Firefox®, etc.). In one embodiment, the instructions or code set associated with the JavaScript program may be provided to the user device 150 by the recording management system 100 as a set of executable instructions configured for execution by the web browser 170 operating on the user device 150. In one embodiment, the user device 150 may employ the web browser 170 to operatively connect with a universal resource locator (URL) associated with the recording management system 100. In response to the URL request, the recording management system 100 may provide the web browser 170 with the content stream generator 172. In another embodiment, the content stream generator 172 may be a plug-in or add-on tool installed in and operable by the web browser 170.

In one embodiment, the content stream generator 172 is executed by the web browser 170 to access an audio input from an audio capture component 176 (e.g., a microphone associated with the user device 150) and a video input from a video source component 178 (e.g., a webcam, a display or screen, etc. associated with the user device 150). In one embodiment, the content stream generator 172 accesses the audio and video inputs through the web browser 170 using a JavaScript call (e.g., an HTML5 getuserMedia call). In one embodiment, the content stream generator 172 merges the audio and video inputs into a data stream. In one embodiment, the data stream is captured, recorded, or stored by a component of the content stream generator 172. For example, the new stream may be sent to a JavaScript MediaRecorder API via a suitable call (e.g., an HTML 5 call).

In one embodiment, at intervals during the recording session, segments of the stream are stored in the local storage 174 associated with the web browser 150. For example, a predetermined interval or period of time (e.g., every minute, every two minutes, every five minutes, etc.) may be established as a setting in the recording management system. In one embodiment, a user of the user device 150 may select the interval or period of time for the segment storing function. In one embodiment, a data dump from the media recorder portion of the content stream generator 172 to the local storage 174 is performed following each period of time. In one embodiment, each data dump includes a segment or portion of the data stream occurring during a previous time interval is during a recording session. Advantageously, instead of having to wait for the entire recording session to complete, real-time storing of the recorded segments (e.g., recorded segment 1, recorded segment 2, recorded segment N) may be performed at the identified intervals.

In one embodiment, as each of the recorded segments is stored in the local storage 174, the stored segment is uploaded to the recording management system 100. In one embodiment, the recording management system 100 may include one or more computing devices, such as a personal computer (PC), a set-top box (STB), a server, a network router, switch or bridge, or any device capable of executing a set of instructions (sequential or otherwise) that specify actions to be taken by that device. In one embodiment, once a file segment (e.g., recorded segment 1 in FIG. 1) is created in the local storage 174, the web browser 170 automatically uploads the recorded segment to an upload manager 118 of the content stream generator 172. In one embodiment, the upload of the recorded segment is performed in response to completion of the storing of that recorded segment in the local storage 172, and may be performed while subsequent recorded segments are created by the content stream generator 172. In one embodiment, a segment-by-segment upload may be performed, such that individual segments are uploaded to the recording management system 100 prior to completion of the entire recorded session (e.g., all of the recorded segments). Advantageously, since the segments are uploaded on an individual basis following each of the predetermined intervals, the complete upload of all the segments is performed more efficiently as compared to conventional systems that upload the entire file following completion of the recording session. Furthermore, the segment-by-segment uploading results in a faster overall upload and a shorter wait time by the user device for the execution of further actions (e.g., the closing of the web browser 170, the closing of a tab of the web browser, the navigating to a different web page using the web browser 170, etc.)

In one embodiment, the upload manager 102 provides the multiple recorded segments to a file generator 104 of the recording management system 100. In one embodiment, once the recording session is complete (e.g., as denoted by a command processed by the user device 150 to "stop" or "terminate" the recording), the file generator 104 identifies all of the recorded segments associated with the recording session and concatenates the segments into a single file. In one embodiment, the individual recorded segments may be associated with a unique identifier that is used to group and order the recorded segments to form the single file including the content of the entire recording session.

In one embodiment, the recording management system 100 includes an adaptive stream generator 106 configured to generate an adaptive stream including the recorded content of the file. In one embodiment, the adaptive stream may be transmitted or otherwise provided to one or more devices for playback of the recorded content. The recipient devices may include one or more user devices (e.g., including the user device 150) or a storage location.

In one embodiment, a request to playback a recorded session may be received by the recording management system 100 from a user device. In one embodiment, the adaptive stream may be transmitted to a recipient user device (e.g., the user device requesting playback of the recorded content) in accordance with one or more computing parameters associated with the user device or a network (not shown in FIG. 1) connecting the recording management system 100 and the user device.

In one embodiment, the recording management system user device 100 includes a memory 102, a processing device 104, a video capture device 106 and a display generator 108. In one embodiment, the processing device 104 may execute one or more programs based on instructions stored in the memory 102 or in another suitable data store.

In one embodiment, the recording management system 100 includes a memory 108 and one or more processing devices 110 configured to perform execution and storage operations associated with one or more programs based on instructions stored in the memory 108 or in another suitable data store. For example, the processing device 110 of the recording management system 100 is configured to execute a program or set of instructions programmed to perform the functions and operations described in greater detail below with respect to FIGS. 2-5.

Figure 2:
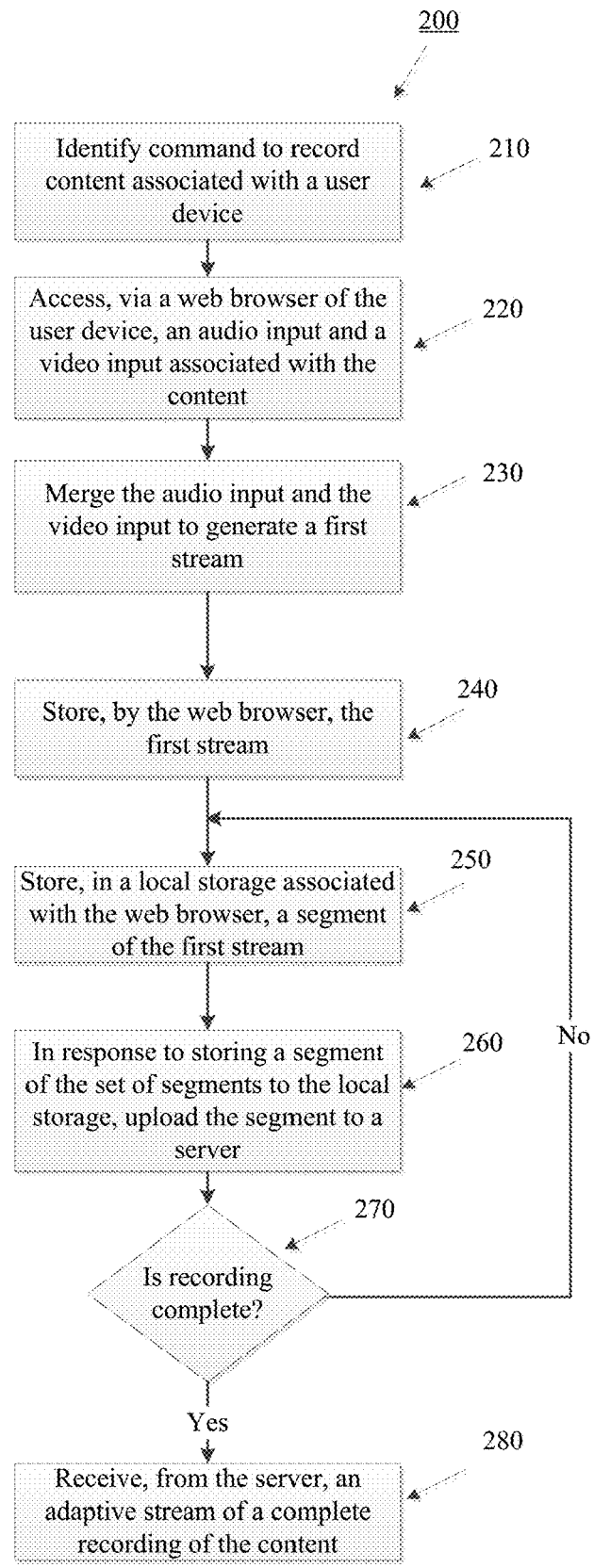
FIG. 2 is a flow chart illustrating an example method for uploading segments of a recorded stream, according to an embodiment.

FIG. 2 is a flow chart depicting an example method 200 for recording an uploading content associated with a user device, according to an embodiment. The method 200 may be performed in a computing environment (e.g., environment 10 of FIG. 1) including a user device (e.g., user device 150 of FIG. 1) executing a web browser (e.g., web browser 110 of FIG. 1) configured to operatively connect to a computing system (e.g., the recording management system 100 of FIG. 1) to perform the functions and steps described herein. According to embodiments of the present application, method 200 may be performed using a JavaScript program that is executable by any suitable web browser type, and, therefore, is not restricted to a single browser type. Advantageously, method 200 may be performed without having to install a client application on the user device. An improvement is achieved by avoiding the need to install dedicated client application which can result in delays associated with installing, launching, and updating of the client application. In addition, installation of a client application can be problematic in restricted computing environments (e.g., corporate networks). In one embodiment, in-browser execution of the method 200 avoids the aforementioned problems associated with installing a dedicated client application.

In an implementation, the example method 200 may be initiated by a user launching or starting a session using a web browser configured with a content stream generator component (e.g., content stream generator 112 of FIG. 1). In block 210, a command to initiate recording of content associated with the user device is identified. In one embodiment, the content to be recorded may be the "on-screen" or content (audio and video components) displayed via one or more outputs of the user device (e.g., a display, speakers, etc.). For example, a user may initiate a web browser session and provide a command (e.g., via clicking on a link or entering a URL associated with the recording management system) to start a recording session.

In block 220, via the web browser of the user device, an audio input and a video input associated with the content is accessed. In one embodiment, the audio input (e.g., audio stream associated with the content being recorded) is accessed by communicatively coupling to an audio input component (e.g., a microphone) of the user device. In one embodiment, the video input (e.g., video stream associated with the content being recorded) is accessed by communicatively coupling to a video input component (e.g., a camera, the display of the user device, etc.) of the user device. In one embodiment, one or more HTML5 calls (e.g., one or more getUserMedia calls) may be employed to access the content (e.g., the audio and video inputs).

In block 230, the audio input and the video input are merged to generate a content stream (also referred to as the "first stream"). In one embodiment, the single stream includes both the audio and video of the content to be recorded. In block 240, the stream is stored (i.e., recorded) by the web browser. In one embodiment, an HTML5 call is executed to store the stream in the web browser, without requiring a server to capture the recording and without a dedicated client application. In one embodiment, the stream is sent to a JavaScript MediaRecorder API to enable the storage of the stream by the web browser.

In block 250, on a periodic basis, a segment of the stream is stored in a local storage associated with the web browser. In one embodiment, at certain intervals or periods, a data dump including a segment of the stream is forced to the local storage of the web browser.

In one embodiment, the periodic intervals (e.g., every five minutes), the segment of the stream is stored in the local storage. In block 260, upon identifying a segment in the local storage, the segment is uploaded to the server (e.g., the recording management system). In one embodiment, by forcing a data dump of the recording stream into small storage segments (e.g., blobs), the individual segments may be uploaded to a recording management system (in block 260) while the recording is in progress (e.g., before completion of the recording session). In one embodiment, this "real-time" uploading of each segment advantageously results in the avoidance of a lengthy delay or waiting period experienced by conventional systems configured to wait until an entire recording is complete before executing the uploading process.

In block 270, a determination is made whether the recording is complete. If the recording is not complete (e.g., the recording session is active and not all of the segments of the stream have been stored in the local storage of the web browser), the process returns to block 250 to store a next segment to local storage. In one embodiment, this continues until all of the segments of the recorded content have been stored in the local storage (and uploaded to the server), thus completing the recording.

In one embodiment, upon completion of the recording, the user device may receive from the recording management system an adaptive stream of a complete recording of the content, in block 280. An example process executed by a recording management system to generate the adaptive stream is described in greater detail below with respect to FIG. 4.

Figure 3:
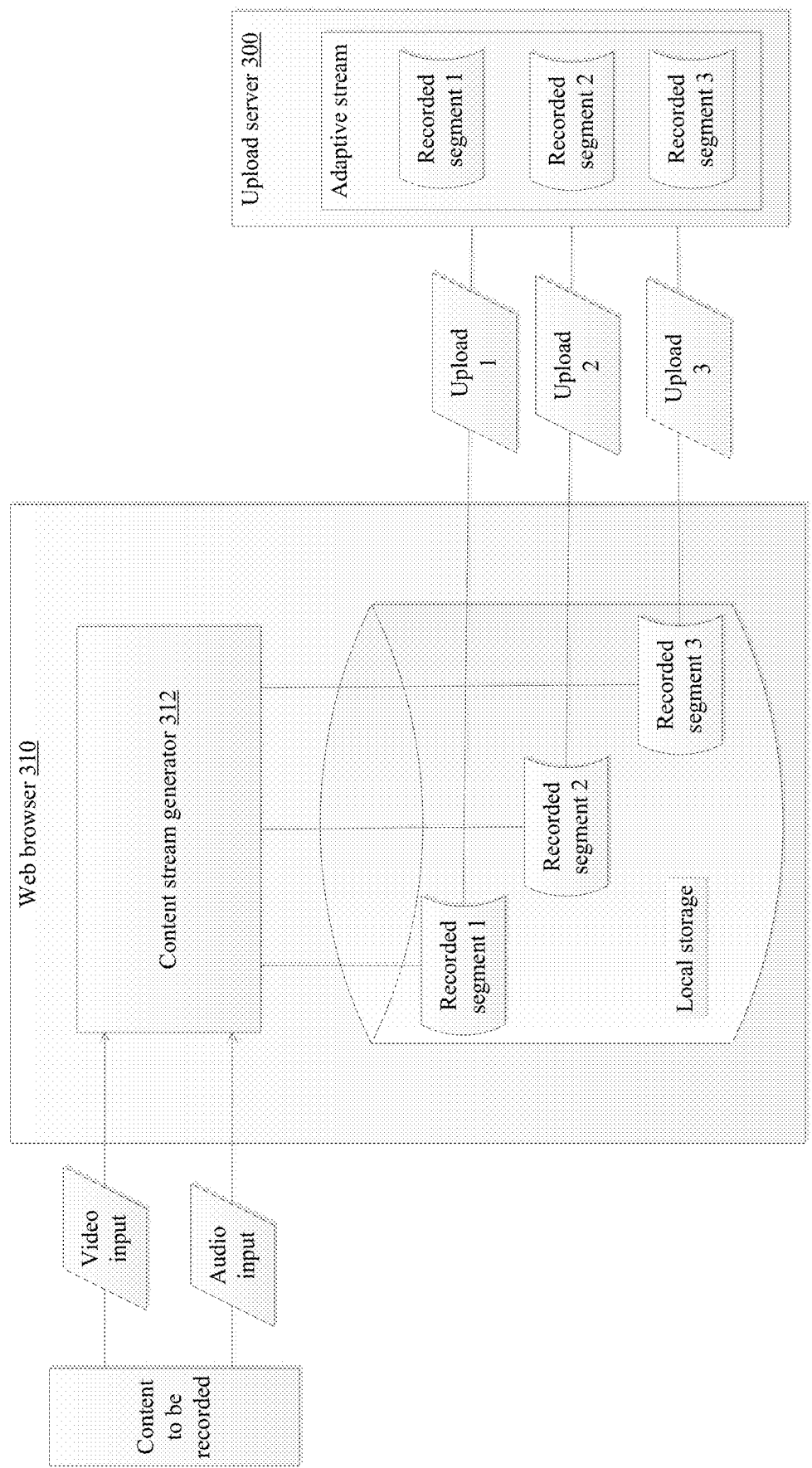
FIG. 3 illustrates a block diagram and example process for uploading recorded segments from a web browser of a user device to a server, according to an embodiment

FIG. 3 illustrates an example environment including components configured to execute aspects of method 200 described above in detail with respect to FIG. 2. As shown in FIG. 3, a web browser 310 of a user device is configured to include a content stream generator 312. As shown in FIG. 3, the content stream generator 312 accesses a video input and audio input associated with content to be recorded.

At periodic intervals (e.g., every one minute, every two minutes, every five minutes, etc.), a segment of the stream generated based on the merger of the video input and the audio input (also referred to as the "recorded segment") is stored to a local storage of the web browser. As the recorded segment (e.g., recorded segment 1) is created in the local storage, the recorded segment is uploaded to an upload server 300. For example, once recorded segment 1 is created in the local storage, it is uploaded to the upload server 300 via upload 1. At a later time (e.g., following the predetermined interval between data dumps), recorded segment 2 is created in the local storage and, without further action, uploaded to the upload server 300 via upload 2. This process continues until all of the recorded segments of the content are uploaded to the upload server 300.

In the example shown in FIG. 3, the entire recording session includes recorded segment 1, recorded segment 2, and recorded segment 3, all of which were uploaded to the upload server 300 once following their respective creation in the local storage of the browser. Advantageously, uploading the segments in real-time (e.g., on a segment-by-segment basis) enables the avoidance of lengthy delays associated with uploading the entire recorded file following the completion of the recording, as is the case in conventional systems. In one embodiment, the upload server 300 generates an adaptive stream including the multiple recorded segments of the content (e.g., recorded segment 1, recorded segment 2, and recorded segment 3) for transmission to one or more computing devices for playback of the recorded content, as described in greater detail with respect to FIG. 4.

Figure 4:
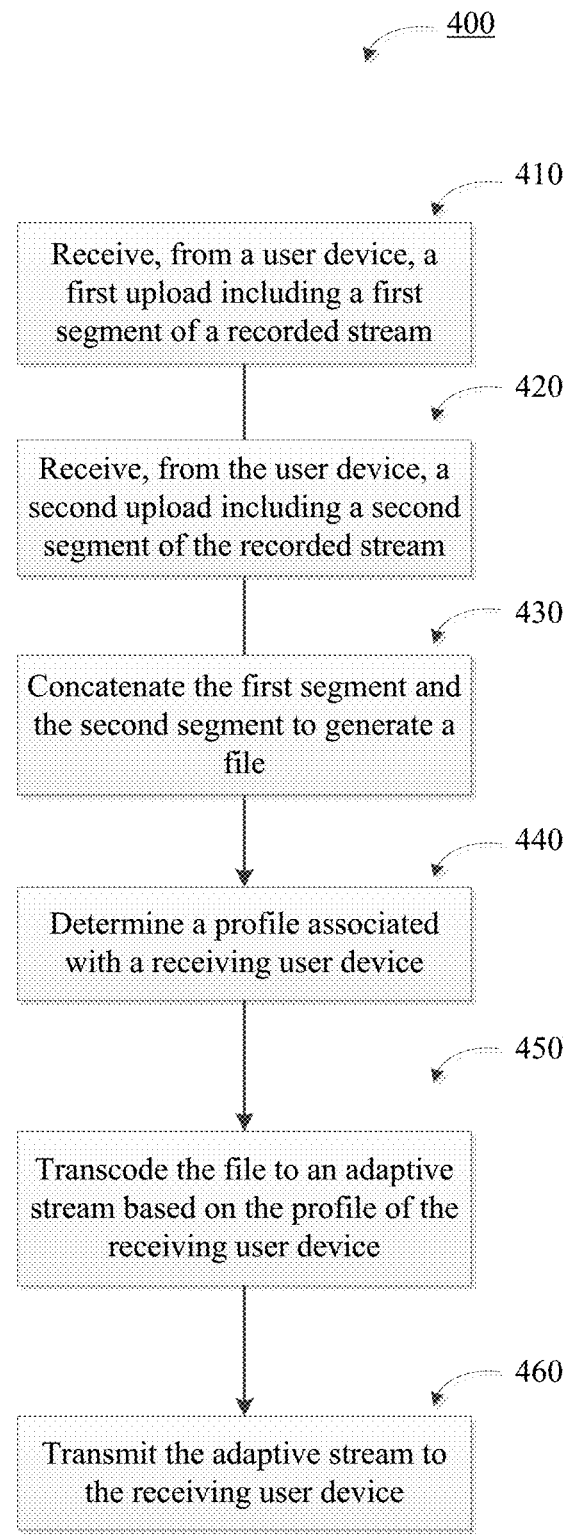
FIG. 4 is a flow chart illustrating an example method for managing segments of a recorded stream, according to an embodiment.

FIG. 4 is a flow chart depicting an example method 400 for managing recorded content generated via a web browser of a user device, according to an embodiment. In one embodiment, the method 400 may be performed by a server executing a recording management system (e.g., recording management system 100 of FIG. 1). In one embodiment, the operations described above with respect to content stream generator of FIGS. 1 and 2 may be enabled by the server. In one embodiment, the content stream generator is provided to the web browser of the user device by the server (e.g., the recording management system). For example, the content stream generator may be provided to the web browser by the server as a JavaScript program.

In block 410, the server (also referred to as the "upload server" in FIG. 3) receives, from a user device, a first upload including a first segment of a recorded stream. In one embodiment, at a later time, the server receives, from the user device, a second upload including a second segment of the recorded stream. Although the example illustrated in FIG. 4 relates to a recording session including a first segment and a second segment, any quantity of segments may be included in a recording session.

In block 430, the server concatenates the first segment and second segment to generate a file including the audio and video of the recorded content. In one embodiment, each of the segments (e.g., the first segment and the second segment) may be associated with identifying information which may be used to associate and concatenate the segments to form the single file. For example, each segment may have a unique identifier, information associated with the order of the segment in the recorded stream, information identifying the source (e.g., user device) of the stream, etc.

In block 440, in response to a request for playback of the recorded content file from a user device, the server determines a profile associated with the receiving user device. In one embodiment, the profile may include parameters relating to the computing resources associated with the user device. Example parameters may include, but are not limited to, network conditions associated with a connection between the receiving user device and the server, an available bandwidth for transmission of the stream, a requested playback quality (e.g., standard definition, high definition, 4K resolution, etc.)

In block 450, the file is transcoded by the server to an adaptive stream based on the profile of the receiving user device. In one embodiment, the transcoding may be performed as an asynchronous background service, enabling queuing of the processing work. Advantageously, the file may be adapted to enable an optimal viewing experience based on the conditions and parameters associated with the receiving user device (e.g., available bandwidth). In block 460, the server transmits the adaptive stream to the receiving user device. In one embodiment, the adaptive stream is played back via a web browser of the receiving user device.

The processes described in FIGS. 2 and 4 may be performed in a different order than is shown in the figures. In addition, in some embodiments, fewer or additional processes may be performed by a user device and recording management system. Although shown as an ordered set of operations, in some embodiments, some processes may be performed in a different order or may be performed in parallel.

Figure 5:
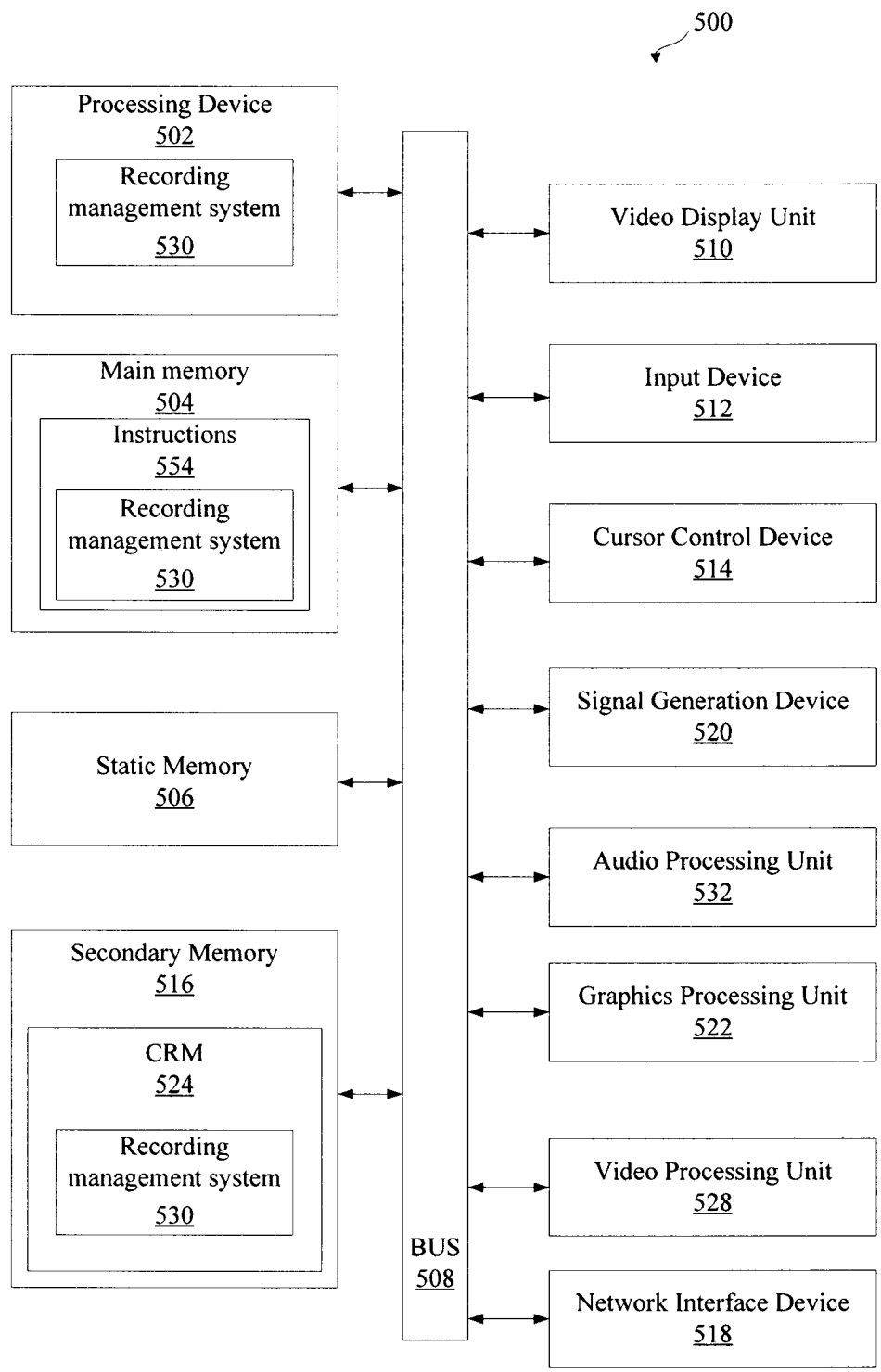
FIG. 5 is a schematic block diagram that provides an example illustration of a computing environment executing instructions relating to managing a recorded stream, according to one embodiment.

FIG. 5 depicts an example computer system 500 which can perform any one or more of the methods described herein for recording video with a teleprompter script overlay. In one example, computer system 500 may correspond to user device 100 of FIG. 1. The computer system may be connected (e.g., networked) to other computer systems in a LAN, an intranet, an extranet, or the Internet. The computer system 500 may operate in the capacity of a server in a client-server network environment. The computer system 500 may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a secondary memory 516 (e.g., a data storage device), which communicate with each other via a bus 508.

The processing device 502 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU (computer processing unit), a multi-core CPU and a massively multi-core system that includes many interconnected integrated circuits, each of which may include multiple processor cores. The processing device 502 may therefore include multiple processors. The processing device 502 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, system on chip (SoC), or the like. The computer system 500 may include a graphics processing unit 522, a video processing unit 528, and an audio processing unit 532.

The computer system 500 may further include a network interface device 518. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium (CRM)) 524 on which is stored one or more sets of instructions embodying any one or more of the methodologies or functions described herein (e.g., video rendering system 120). The main memory 504 may also store, completely or partially, instructions 554 embodying any one or more of the methodologies or functions described herein (e.g., recording management system 100 and user device 170 of FIG. 1). Furthermore, the processing device 502 may include instructions to implement video rendering system 120 during execution thereof by the computer system 500. The main memory 504 and the processing device 502 may also include machine-readable storage media.

While the computer-readable storage medium 524 is shown in an exemplary implementation to be a single medium, the term "computer-readable storage medium" (or "computer-readable medium") should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present disclosure. The term "computer-readable storage medium" shall accordingly be taken to include, but not be limited to, non-transitory media such as solid-state memories, and optical and magnetic media.

The modules, components and other features described herein may be implemented as discrete hardware components or integrated in the functionality of hardware components such as ASICS, FPGAs, DSPs, SoCs, or similar devices. In addition, the modules can be implemented as firmware or functional circuitry within hardware devices. Further, the modules can be implemented in any combination of hardware devices and software components, or only in software.

Some portions of the detailed descriptions above are presented in terms of algorithms and symbolic representations of operations within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "recording", "identifying", "accessing", "merging", "storing", "performing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first", "second", "third", "fourth", etc. as used herein are meant as labels to distinguish among different elements and may not necessarily have an ordinal meaning according to their numerical designation.

Implementations of the present disclosure also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other implementations will be apparent to those of skill in the art upon reading and understanding the above description. Although the present disclosure has been described with reference to specific exemplary implementations, it will be recognized that the disclosure is not limited to the implementations described, but can be practiced with modification and alteration within the spirit and scope of the disclosure. Accordingly, the specification and drawings are to be regarded in an illustrative sense rather than a restrictive sense. The scope of the disclosure should, therefore, be determined along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

What is claimed is:

1. A method comprising:
   identifying, by an embedded program of a web browser executable by a processing device, at a first time, a command to record content accessed from a video source component associated with a user device;
   accessing, by the embedded program, via the web browser executed by the user device, an audio input and a video input associated with the content accessed from the video source component associated with the user device;

merging, by the embedded program, the audio input and the video input to generate at least a portion of an in-progress stream;

capturing, by a media recorder component of the embedded program, at least a portion of the in-progress stream comprising merged data including the audio input and the video input accessed from the video source component associated with the user device;

initiating, at a second time occurring at a predetermined periodic interval following the first time associated with the command, a first storing of a first segment of the stream in a local storage associated with the web browser, wherein the first segment comprises a first portion of the stream accruing in the media recorder component between the first time and the second time, and wherein the first segment is provided to the local storage by the media recorder component;

associating the first segment with a first unique identifier;

initiating, at a third time occurring at the predetermined periodic interval following the second time, a second storing of a second segment of the stream in the local storage associated with the web browser, wherein the second segment comprises a first second portion of the stream accruing in the media recorder component between the second time and the third time, and wherein the second segment is provided to the local storage by the media recorder component;

in response to identifying a first completion of the first storing of the first segment in the local storage and prior to a second completion of the second storing of the second segment in the local storage, uploading, by the web browser, the first segment of the stream and the first unique identifier to an operatively coupled server while the second storing of the second segment is in progress;

associating the second segment with a second unique identifier;

in response to identifying the second completion of the second storing of the second segment in the local storage, uploading the second segment of the stream to the operatively coupled server;

in response to a subsequent command to terminate recording of the content, identifying a completed stream comprising the first segment and the second segment; and generating a file comprising the completed stream using the first unique identifier and the second unique identifier to concatenate the first segment and the second segment.

2. The method of claim 1, wherein the storing of the first segment to the local storage of the web browser comprises a data dump at the predetermined periodic interval of a portion of the stream captured by the media recorder component.

3. The method of claim 1, wherein the audio input and the video input comprise on-screen content of a display of the user device.

4. The method of claim 1, further comprising receiving, by the web browser, a playback stream of the file at a rate adapted based on one or more computing parameters associated with the user device.

5. A system comprising:
a processing device; and
memory to store computer-executable instructions that, if executed, cause the processing device to perform operations comprising:

identifying, by an embedded program of a web browser executable by the processing device at a first time, a command to record content accessed from a video source component associated with a user device;

accessing, by the embedded program, via the web browser executed by the user device, an audio input and a video input associated with the content accessed from the video source component associated with the user device;

merging, by the embedded program, the audio input and the video input to generate at least a portion of an in-progress stream;

capturing, by a media recorder component of the embedded program, at least a portion of the in-progress stream comprising merged data including the audio input and the video input accessed from the video source component associated with the user device;

initiating, at a second time occurring at a predetermined periodic interval following the first time associated with the command, a first storing of a first segment of the stream in a local storage associated with the web browser, wherein the first segment comprises a first portion of the stream accruing in the media recorder component between the first time and the second time, and wherein the first segment is provided to the local storage by the media recorder component;

associating the first segment with a first unique identifier;

initiating, at a third time occurring at the predetermined periodic interval following the second time, a second storing of a second segment of the stream in the local storage associated with the web browser, wherein the second segment comprises a first second portion of the stream accruing in the media recorder component between the second time and the third time, and wherein the second segment is provided to the local storage by the media recorder component;

in response to identifying a first completion of the first storing of the first segment in the local storage and prior to a second completion of the second storing of the second segment in the local storage, uploading, by the web browser, the first segment of the stream and the first unique identifier to an operatively coupled server while the second storing of the second segment is in progress;

associating the second segment with a second unique identifier;

in response to identifying the second completion of the second storing of the second segment in the local storage, uploading the second segment of the stream to the operatively coupled server;

in response to a subsequent command to terminate recording of the content, identifying a completed stream comprising the first segment and the second segment; and generating wherein a file comprising the completed stream is generated using the first unique identifier and the second unique identifier to concatenate the first segment and the second segment.

6. The system of claim 5, the operation further comprising determining a profile associated with a receiving user device requesting playback of the stream, wherein the profile comprises one or more computing parameters associated with the receiving user device.

7. The system of claim 6, wherein the one or more computing parameters comprise a bandwidth associated with the receiving user device.

8. The system of claim 5, further comprising providing the embedded program to the web browser of the user device, wherein the embedded program generates the first segment and the second segment of the recorded stream.

9. The system of claim 8, wherein the embedded program causes the first segment to be stored in the local storage of the web browser.

10. The system of claim 5, wherein the upload of the first segment occurs prior to or during the second storing of the second segment to the local storage associated with the web browser of the user device.

11. A non-transitory computer-readable storage device storing computer-executable instructions that, if executed by a processing device, cause the processing device to perform operations comprising:
- identifying, by an embedded program of a web browser executable by the processing device at a first time, a command to record content accessed from a video source component associated with a user device;
- accessing, by the embedded program, via the web browser executed by the user device, an audio input and a video input associated with the content accessed from the video source component associated with the user device;
- merging, by the embedded program, the audio input and the video input to generate at least a portion of an in-progress stream;
- capturing, by a media recorder component of the embedded program, at least a portion of the in-progress stream comprising merged data including the audio input and the video input accessed from the video source component associated with the user device;
- initiating, at a second time occurring at a predetermined periodic interval following the first time associated with the command, a first storing of a first segment of the stream in a local storage associated with the web browser, wherein the first segment comprises a first portion of the stream accruing in the media recorder component between the first time and the second time, and wherein the first segment is provided to the local storage by the media recorder component;
- associating the first segment with a first unique identifier;
- initiating, at a third time occurring at the predetermined periodic interval following the second time, a second storing of a second segment of the stream in the local storage associated with the web browser, wherein the second segment comprises a first second portion of the stream accruing in the media recorder component between the second time and the third time, and wherein the second segment is provided to the local storage by the media recorder component;
- in response to identifying a first completion of the first storing of the first segment in the local storage and prior to a second completion of the second storing of the second segment in the local storage, uploading, by the web browser, the first segment of the stream and the first unique identifier to an operatively coupled server while the second storing of the second segment is in progress;
- associating the second segment with a second unique identifier;
- in response to identifying the second completion of the second storing of the second segment in the local storage, uploading the second segment of the stream to the operatively coupled server;
- in response to a subsequent command to terminate recording of the content, identifying a completed stream comprising the first segment and the second segment; and
- generating a file comprising the completed stream using the first unique identifier and the second unique identifier to concatenate the first segment and the second segment.

12. The non-transitory computer-readable storage device of claim 11, the operations further comprising determining a profile associated with a receiving user device requesting playback of the stream, wherein the profile comprises one or more computing parameters associated with the receiving user device.

13. The non-transitory computer-readable storage device of claim 12, wherein the one or more computing parameters comprise a bandwidth associated with the receiving user device.

14. The non-transitory computer-readable storage device of claim 11, wherein the upload of the first segment occurs prior to or during the second storing of the second segment to the local storage associated with the web browser of the user device.

15. The non-transitory computer-readable storage device of claim 14, wherein the embedded program is configured to be executed by a plurality of different web browser types.

* * * * *